Nov. 18, 1924.  
T. A. PEEBLES  
1,516,456  
REGULATION OF COMBUSTION OF PULVERIZED FUEL  
Filed Aug. 27, 1923  2 Sheets-Sheet 1

FIG. 1.

INVENTOR  
Thomas A. Peebles  
by Dominic S. Wolcott  
Atty

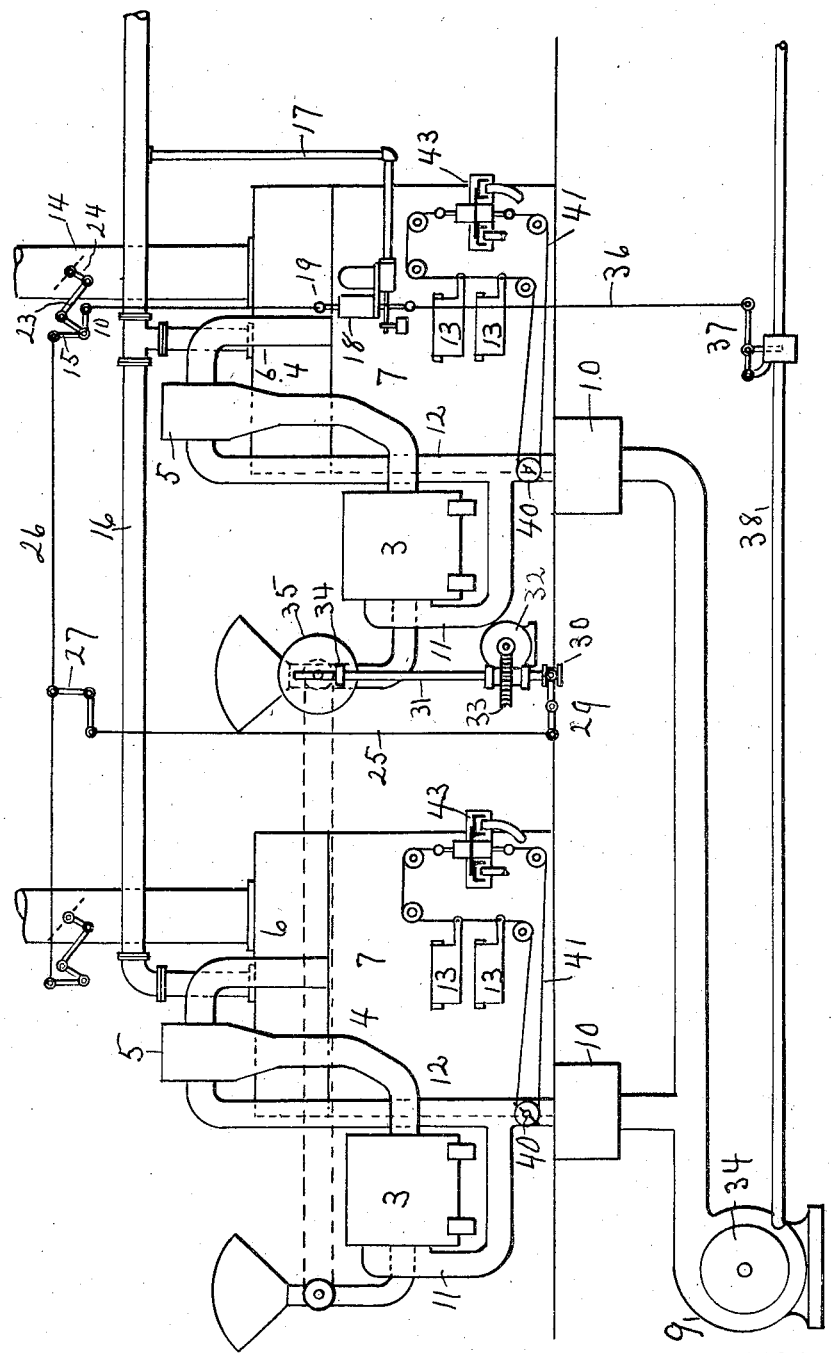

Patented Nov. 18, 1924.

1,516,456

UNITED STATES PATENT OFFICE.

THOMAS A. PEEBLES, OF PITTSBURGH, PENNSYLVANIA, ASSIGNOR TO JOHN M. HOPWOOD, OF PITTSBURGH, PENNSYLVANIA.

REGULATION OF COMBUSTION OF PULVERIZED FUEL.

Application filed August 27, 1923. Serial No. 659,446.

To all whom it may concern:

Be it known that I, THOMAS A. PEEBLES, residing at Pittsburgh, in the county of Allegheny and State of Pennsylvania, a citizen of the United States, have invented or discovered certain new and useful Improvements in Regulation of Combustion of Pulverized Fuel, of which improvements the following is a specification.

The invention described herein relates to the regulation of the discharge of gases from the furnace of a vapor generator, and a primary regulation of the supply of pulverized fuel and the supply of air for combustion by and in accordance with the demand on the generator and a secondary regulation of the supply of fuel and air for combustion by and in accordance with changes of pressure of gases in the furnace of the vapor generator. The invention is hereinafter more fully described and claimed.

In the accompanying drawings forming a part of this specification, Fig. 1 is a diagrammatic view showing a vapor generator having combined therewith mechanism for effecting the regulation of the supply of fuel and air for combustion and the discharge of products of combustion; Fig. 2 is a similar view showing the improvements claimed herein applied to a plurality of vapor generators.

In the practice of the invention the fuel is placed in a hopper 1 from which it is fed by a screw 2 into a pulverizer 3 of any suitable construction. The pulverized coal, as it is reduced in the pulverizer, is carried therefrom by a current of air through a conduit 4 into a separator 5 wherein a grading of the material is effected and the particles of sufficient fineness are carried by the current of air through a pipe 6 into the furnace 7 (preferably at the top of the latter) of a vapor generator 8. The air for removing the pulverized material from the pulverizer to the separator is supplied by a fan 9 connected to a wind box 10 from which air passes through the conduit 11 into the pulverizer through which it passes picking up material and delivering it into the conduit 4. As is readily understood by those skilled in the art, the rate of flow of air through the pulverizer is regulated so that only a certain grade of material will be removed therefrom, and it frequently occurs that such rate of flow through the pulverizer is not sufficient to deliver the coal through the separator or grader and into the furnace. Hence, provision is made whereby air may flow direct into the separator by a conduit 12. In cases where the quantity of the air entering the furnace with the pulverized fuel through the conduit 6 is not sufficient for complete combustion of the coal, provision is made for the admission of air at different points in the travel of the fuel in the furnace, for admission of additional quantities of air for such combustion, the admission of such additional quantities of air being controlled by dampers 13. Provision is also made, as by a damper 14, for controlling the rate of flow of the products of combustion from the furnace. The rate of flow of these other products is controlled by and in accordance with changes of pressure of vapor, or in other words, with the demand on the generator, by a master regulator A. This regulator which is preferably of the construction shown and described in Letters Patent No. 1,371,243, granted March 15, 1921, to John M. Hopwood, is preferably connected to the steam outlet pipe 16 by a pipe 17. As described in said patent, this master regulator embodies a cylinder 18 having a piston 19 which in the construction shown, is connected to an arm 20 on the shaft 21. This shaft is also provided with an arm 22 connected by a link 23 to an arm 24 on the shaft carrying the damper 14 so that by the operation of the piston in the cylinder 18, the stack damper will be shifted towards open or closed position dependent upon the pressure in the vapor generator or the demand thereon. The shaft 21 has also an arm 15 connected by a cord or rod 26 to an arm of a bell crank lever 27. The other arm of such lever is connected by a rod 28 to one end of a lever 29. The opposite end of this lever engages a collar 30 on the lower end of a shaft 31 which is adapted to be rotated by a motor 32 having its armature shaft operatively connected through a worm and gear to the shaft 31. This shaft is also provided with a drum 34 adapted to frictionally engage a disc 35 on the shaft of the feed screw 2. In such a construction the movement of the piston of the cylinder 18 will so shift the shaft 31 as to move the drum 34 towards or away from the axis of rotation of the disc 35 and thereby vary the rate of feed of coal to the pulverizer.

The piston rod 19 of the cylinder 18 is also connected by a cord 36 or other suitable means to a lever operating a valve mechanism 37 in the pipe 38 leading to the motor 39 of the fan 9. This valve mechanism is preferably of the construction known as the roto reciprocating valve and shown and described in Patent No. 1,247,217 granted November 20, 1917, to Brown & Reeser, and is adapted to effect an incremental shifting of the valve mechanism controlling the flow of fluid pressure to the motor proportional to the incremental movement of the master regulator.

The flow of air to the pulverizer and also to the separator 5 is controlled by a damper 40 in the conduit 11 and this damper together with the valves 13, when such valves are employed, are controlled by and in accordance with changes of pressure in the furnace 7. The shifting of the dampers and valves by such pressure is preferably effected through what is known as a furnace machine, and the construction of such furnace machine is preferably such as described in and shown at the right in Figs. 3, 4, and 5 of Patent No. 1,338,923, granted May 4, 1920, to John M. Hopwood.

It will be observed that the rate of the supply of fuel to the furnace is dependent in the first place on the rate of operation of the feed screw which is regulated as hereinbefore described through the master regulator, operated as stated, on changes in the demand on the generator, and in the second place, the rate of delivery of fuel to the furnace is dependent on the rate of flow of air through the pulverizer and the air so flowing through the pulverizer is controlled by the damper 40 arranged in the conduit 11 and this damper 40 is operative through a cord 41 by the piston of the cylinder in the furnace machine B. In the operation of the furnace machine, fluid pressure for operating the piston would be admitted to one or the other end of the cylinder by and in accordance with changes in pressure by the position of a lever 43 carrying inverted cups arranged in a tank, one of said cups being subjected to pressure in the furnace through the pipe 44. The admission of air for secondary combustion in the furnace is also controlled by this furnace machine, the valves 13 for admitting such secondary air being operatively connected to the cord 41 as clearly shown.

When applying the improvement to a plurality of boilers, as shown in Fig. 2, the admission of fuel to the generators of the several boilers is controlled by a single master regulator as shown at the right in Fig. 2, but the secondary control of the fuel for such boiler is controlled by a furnace machine for such boiler or unit.

The regulation of the fan 9 by and in accordance with changes in the demand on the generator, is substantially the same and for the purpose described and claimed in an application filed by me December 18, 1922, Serial Number 607,628, and patented May 6, 1924, Patent No. 1,492,604, i. e., to maintain on the inlet side of the damper 40 a pressure varying as the position of the damper changes, so that the drop of pressure across the damper will be approximately the same in all positions of the damper.

I claim herein as my invention:

1. The combination of a vapor generator having a furnace, means for supplying pulverized fuel to said furnace controlled by and in accordance with the demand on the generator and by and in accordance with the pressure of gases in the furnace of the generator.

2. The combination of a vapor generator having a furnace, a pulverizer, means controlled by and in accordance with the demand on the generator for regulating the supply of coal to the pulverizer, means for causing the flow of air through the pulverizer and into the furnace, and means for regulating the rate of flow of such air operative by and in accordance with the pressure of gases in the furnace.

3. The combination of a vapor generator having a furnace, a pulverizer, means operative by and in accordance with the demand on the generator for regulating the feed of coal to the pulverizer and the pressure of gases in the furnace and means controlled by and in accordance with the pressure of gases in the furnace for transferring pulverized coal from the pulverizer into the furnace.

4. The combination of a vapor generator having a furnace, means for supplying pulverized fuel to said furnace controlled by and in accordance with the demand on the generator and by and in accordance with the pressure of gases in the furnace of the generator, and means for controlling the supply of air for combustion to the furnace by and in accordance with the pressure of gases in the furnace.

5. The combination of a vapor generator having a furnace, a pulverizer connected to the furnace, means for regulating the feed of coal to the pulverizer by and in accordance with the demand on the generator, a fan connected to the pulverizer and means for regulating the flow of air from the fan to the pulverizer operative by and in accordance with the pressure of gases in the furnace.

6. The combination of a vapor generator having a furnace, a pulverizer connected to the furnace, means for regulating the feed of coal to the pulverizer by and in accordance with the demand on the generator, a fan connected to the pulverizer, means operative by and in accordance with the demand on the generator for regulating the speed of the fan, and means for regulating the flow of air from the fan to the pulverizer operative by and in accordance with the pressure of gases in the furnace.

7. The combination of a vapor generator having a furnace, a pulverizer, a separator connected to the pulverizer, and to the furnace, means controlled by and in accordance with the demand on the generator for feeding coal to the pulverizer, and means controlled by and in accordance with the pressure of gases in the furnace for regulating the flow of air through the pulverizer and separator into the furnace.

8. The combination of a vapor generator having a furnace, a pulverizer, a separator connected to the pulverizer and furnace, a fan, means controlled by and in accordance with the demand on the generator for feeding coal to the pulverizer, and controlling the operation of the fan, connections from the fan to the pulverizer and separator and means controlled by and in accordance with the pressure of gases in the furnace for regulating the flow of air to the pulverizer and separator.

9. The combination of a vapor generator having a furnace, a pulverizer connected to the furnace, means controlled by and in accordance with the demand on the generator for controlling the discharge of gases from the furnace and the feed of fuel to the pulverizer, a fan connected to the pulverizer, and means controlled by and in accordance with the pressure of gases in the furnace for controlling the flow of air to the pulverizer and the supply of air for secondary combustion to the furnace.

In testimony whereof, I have hereunto set my hand.

THOMAS A. PEEBLES.